(12) United States Patent  
Tehranchi

(10) Patent No.: US 9,901,003 B2  
(45) Date of Patent: Feb. 20, 2018

(54) ACCESS DEVICE HOUSING WITH DEPLOYABLE COVER FOR USER INTERFACE

(71) Applicant: VIKING ACCESS SYSTEMS, LLC, Irvine, CA (US)

(72) Inventor: Ali Tehranchi, Irvine, CA (US)

(73) Assignee: Elika Access Systems, LLC, Irvine, CA (US)

( * ) Notice: Subject to any disclaimer, the term of this patent is extended or adjusted under 35 U.S.C. 154(b) by 169 days.

(21) Appl. No.: 14/836,018

(22) Filed: Aug. 26, 2015

(65) Prior Publication Data

US 2017/0064855 A1    Mar. 2, 2017

(51) Int. Cl.
| | |
|---|---|
| *H05K 5/03* | (2006.01) |
| *G06F 3/0488* | (2013.01) |
| *G06F 3/02* | (2006.01) |
| *H05K 5/02* | (2006.01) |
| *G06F 1/16* | (2006.01) |
| *G06F 1/18* | (2006.01) |
| *G06F 21/00* | (2013.01) |
| *G07F 19/00* | (2006.01) |

(52) U.S. Cl.
CPC ............ *H05K 5/0239* (2013.01); *G06F 1/16* (2013.01); *G06F 1/181* (2013.01); *G06F 21/00* (2013.01); *G07F 19/20* (2013.01)

(58) Field of Classification Search
CPC .. G06F 21/604; G06F 3/0202; G06F 3/04886; G06F 1/1616; G06F 1/1626; G06F 1/1677; G06F 1/16; G06F 1/181; G06F 21/00; G06F 1/1679; G06F 1/1662; H05K 5/03; H05K 9/0069; H05K 5/0239; G07F 11/60; G07F 11/62; G07F 19/20
USPC ...................................................... 361/679.01
See application file for complete search history.

(56) References Cited

U.S. PATENT DOCUMENTS

| | | | | |
|---|---|---|---|---|
| 7,457,204 | B1* | 11/2008 | Winters | G04G 13/02 368/10 |
| 8,253,595 | B2* | 8/2012 | Yang | H04M 1/18 206/320 |
| 2006/0139148 | A1* | 6/2006 | Faro | G07C 9/00103 340/5.73 |
| 2012/0068936 | A1* | 3/2012 | Kim | G06F 3/021 345/169 |
| 2013/0117078 | A1* | 5/2013 | Weik, III | G06Q 10/00 705/13 |

* cited by examiner

*Primary Examiner* — Anthony Haughton
*Assistant Examiner* — Ingrid Wright
(74) *Attorney, Agent, or Firm* — Jafari Law Group, Inc.

(57) ABSTRACT

The present invention involves an access device for a movable barrier configured to include a user interface, and more specifically, a movable barrier access device configured to include a deployable cover that covers the user interface when not being utilized. This will assist in extending the usable life of the access device by disallowing exposure to the elements when not in use. The deployable cover can be actuated as a result of signals sent from one or more sensors that are configured to detect any specified stimulus from the surrounding environment outside of the housing. Some of the specified stimuli are the presence of motion and rain in proximity to the access device housing.

17 Claims, 10 Drawing Sheets

ACCESS DEVICE HOUSING WITH DEPLOYABLE COVER FOR USER INTERFACE

TECHNICAL FIELD OF THE INVENTION

The present invention relates generally to access devices for movable barrier systems. More specifically, the invention relates to a movable barrier access device housing configured to include a deployable cover that covers the user interface when not being utilized.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Typically, access to a secure premises, such as a gated area, building, or parking structure, requires that the user utilize some form of access device, either to directly open a barrier in order to gain entry, or otherwise to communicate with an internal or external client who then authorizes entrance for said user. This device often includes some type of user interface component, such as a display screen, input keypad, input keyboard, radio transmitter, or biometric sensor, which allows the user to operate the device. Furthermore, these access devices are normally found on the outside of the secure premises and, in many instances, are located outdoors, leaving them exposed to potentially corrosive weather and harmful external elements. Without adequate protection, this exposure can result in accelerated corrosion and malfunctioning of the device, leading to expensive repairs or outright replacement of the device.

For example, an access device configured to provide vehicle access to a barrier-controlled premise, such as a gated community, is likely to be located outdoors, adjacent to the entrance gate, in order to allow the user to operate the device without being required to step out of their vehicle. This device is located outdoors as a practical matter; it may be inconvenient to require the user to park their car and walk to an indoor location in order to gain vehicle entry to the premises. Thus, out of this necessity, an access device may be left exposed to rain, moisture, snow, sand, heat, freezing temperatures, or any other weather or environmental conditions that can potentially damage the mechanical or electrical components of the device.

Some access devices may comprise a casing or housing assembly as a means of covering the internal components of the device from the surrounding environment. However, in order to allow the user interface component to remain accessible to the user, it is often not contained within the housing, and thus may not be adequately protected from the elements. That is, because the housing unit may not fully encompass the user interface, this component may still be exposed to potentially damaging conditions, and without adequate protection, the user interface may suffer the detriments of this exposure.

For example, an access device configured to provide access to a gated community may include a user interface with a numbered keypad to allow the user to input an access code to gain entry to the premises or contact an internal or external client, as well as a display to allow the user to select from a list of clients and their respective contact information. Repeated exposure of these components to even mild environmental factors may cause irreparable damage such as rain water seeping in through the edges of the numerical keypad. This could cause malfunctions, which results in higher maintenance and replacement costs. Moreover, the exposed user interface may act as an entry point to the internal components of the access device, allowing the rainwater to trickle in causing additional damage, and thereby diminishing any benefit derived from the housing assembly.

Therefore, there exists a need in the art for an improved means of protecting the components of an access device from the surrounding environment without sacrificing ease of access for a user. It is to these ends that the present invention has been developed.

SUMMARY OF THE INVENTION

To minimize the limitations in the prior art, and to minimize other limitations that will be apparent upon reading and understanding the present specification, the present invention describes an access device configured to include a deployable cover for the user interface. The deployable cover may be transparent, semi-transparent, or opaque in visual appearance. The access device may include sensors, which may be configured to generate actuation of the deployable cover in response to various specified stimuli. The deployable cover will help extend the life of the access device by disallowing undue exposure to the environment and external elements when not in use.

An access device for a movable barrier system, in accordance with one embodiment of the present invention, comprises: a user interface configured to facilitate a communication with a client device and authorize access via a movable barrier; and a housing containing the user interface, including: an opening for exposing a keypad of the user interface; a cover for covering the keypad; and a cover cavity adjacent to the opening, for slidably receiving the cover whenever the cover is opened to reveal the keypad, wherein: the cover cavity is situated to a side of the opening; and the cover is configured to slide sideways between opened and closed positions.

An access device for a movable barrier system, in accordance with another embodiment of the present invention, comprises: a housing containing a user interface configured to facilitate a communication with a client device and authorize access via a movable barrier, the housing including: an opening for exposing a keypad of the user interface; a cover for covering the keypad; and a cover cavity adjacent to the opening, for slidably receiving the cover whenever the cover is actuated to reveal the keypad; one or more sensors substantially housed within the housing; an actuator contained within the housing and mechanically coupled to the cover; and a controller situated within the housing and configured to: receive a sensing signal from the one or more sensors; and automatically actuate the cover in response to the sensing signal.

An access device for a movable barrier system, in accordance with yet another embodiment of the present invention, comprises: a housing containing a user interface configured to facilitate a communication with a client device and authorize access via a movable barrier, the housing including: an opening for exposing the user interface; and a hinged cover for covering the opening configured to swing between an opened and closed position; one or more sensors substantially housed within the housing; an actuator contained within the housing and mechanically coupled to the hinged cover; and a controller situated within the housing and configured to: receive a sensing signal from the one or more sensors; and automatically actuate the cover in response to the sensing signal.

It is an objective of the present invention to provide a protective housing for an access device for movable barrier systems.

It is another objective of the present invention to provide an access device that protects a user interface from the environment.

It is yet another objective of the present invention to provide an access device housing with a deployable cover, which may be operated manually and automatically.

It is yet another objective of the present invention to provide an access device that automatically deploys a cover with the aid of sensors.

These advantages and features of the present invention are not meant as limiting objectives, but are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. The drawings that accompany the detailed description can be briefly described as follows.

DETAILED DESCRIPTION OF THE INVENTION

Figure 1:
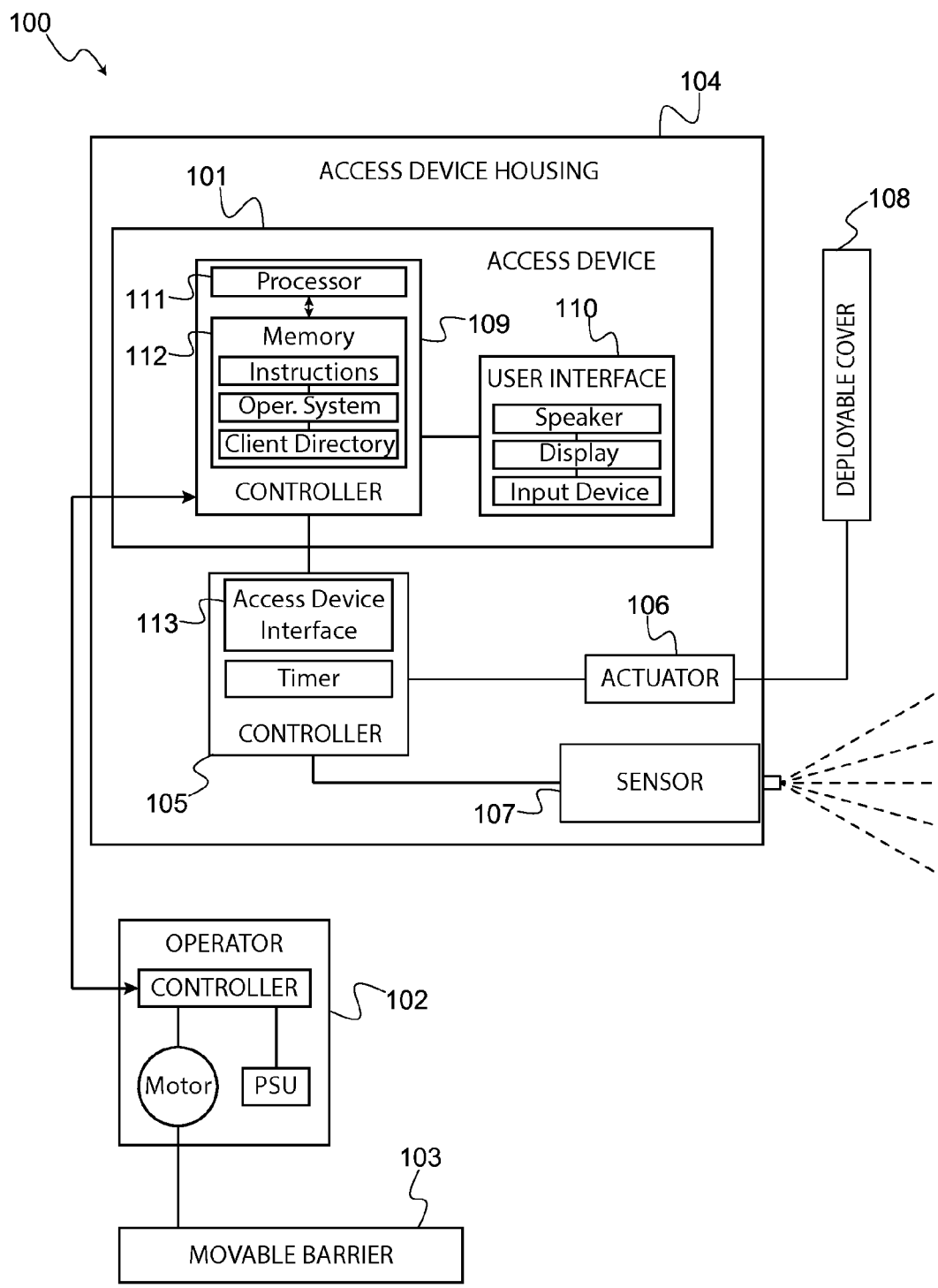
FIG. 1 is a block diagram illustrating a system in accordance with one embodiment of the present invention.

In the following discussion that addresses a number of embodiments and applications of the present invention, reference is made to the accompanying figures, which form a part thereof. Depictions are made, by way of illustration, of specific embodiments in which the invention may be practiced; however, it is to be understood that other embodiments may be utilized and changes may be made without departing from the scope of the present invention.

In the following detailed description, a movable barrier system may be any system that controls a movable barrier to an entry, an exit, or a view. The movable barrier could be a door for a small entity (i.e. a person), or a gate for a large entity (i.e. a vehicle), which may swing out, slide open, roll upwards, or operate in any other manner suitable to control access through the entry, exit, or view. The operator that controls the barrier may move the barrier from an open position to a closed position and vice-versa, or simply provide a means to lock and unlock the barrier. The operator may be automatic and may be controlled locally or remotely. Additionally, an operator may comprise of one or more motors, actuators locking mechanisms, or barrier control module including one or more components configured to move, open, close, lock, unlock, or otherwise control a movable barrier. Furthermore, in the present disclosure, the term barrier control module is defined broadly and may be any device one or more devices that create motion, convert electricity into mechanical motion, or electromagnetic device for moving or controlling a mechanism or system, and may include without limitation, an electric motor such as an AC motor or a DC motor, an actuator, hydraulics, pneumatics, mechanical locks, or electromagnetic locks. Electromagnetic locks may comprise of a solenoid, magnetic lock or strike, an electromagnet and armature plate, or any other locking means. Electromagnetic locks may include fail safe electromagnetic devices that are unlocked when de-energized, or fail secure electromagnetic devices that remain locked when power is lost. A system in accordance with the present invention may also include sensors. Sensors may include, motion sensors, capacitive sensors, proximity sensors, inductive sensors, image sensors, rain sensors, or any other type of sensing device such as switches, buttons, or any other means of detecting a change in one or more parameters. A system in accordance with the present invention also includes an access device. An access device may be a device separate or integral with the operator, which may be used to communicate with a client device for obtaining access through the movable barrier. The access device is typically located remotely from the client device somewhere near the movable barrier; as users approach the movable barrier, they may utilize the access device to communicate with the client device in order to gain entry. The access device communicates with the client device via a communications network.

Generally, the present invention involves an access device for a movable barrier configured to include a user interface. More specifically, a movable barrier access device in accordance with the present invention implements a housing with a deployable cover that covers the user interface component. Some embodiments of the user interface may include; a display; a display and a keypad; or a display and an alphanumeric keyboard. The deployable cover may be configured to be visually transparent, semi-transparent, or opaque in its appearance. Advantages of implementing a deployable cover for a user interface include: disallowing exposure to the elements when the user interface is not being utilized and thus assist in extending the usable life of the access device.

Turning now to the figures, FIG. 1 is a block diagram illustrating a system in accordance with one embodiment of the present invention. More specifically, FIG. 1 shows system 100, which includes movable barrier access device (access device 101), movable barrier operator (operator 102), movable barrier 103, access device housing (housing 104), deployable cover controller (controller 105), actuator 106, sensor 107, deployable cover 108, access device controller (controller 109), and access device user interface (user interface 110).

Operator 102 may be any type of movable barrier operator suitable to actuate, operate, or otherwise control access to a premise via movable barrier 103. Thus, operator 102 may be configured as a swing gate operator that swings open, a sliding gate operator that moves a gate on a track, a locking mechanism that locks and unlocks a door to an entry, or any other type of operator suitable for controlling the type of movable barrier that may be implemented with system 100.

Movable barrier 103 may be any type of barrier blocking or inhibiting free access to a premise. For example, movable barrier 103 may block or inhibit an entrance to a walkway, a room, or a storage space; movable barrier 103 may also be a gate to a gated community, a parking structure, or any other secured area. In one embodiment, movable barrier 103 is a sliding gate; in another embodiment, movable barrier 103 is a swing gate; in yet another embodiment, movable barrier 103 may be a lockable doorway inside a building or a lockable gate on a walkway.

Access device 101 may be any type of device configured to communicate with movable barrier operator 102, directly or via a third party client device, in order to actuate, operate, or otherwise control access to a premises via movable barrier 103. Access device 101 may comprise of controller 109 and user interface 110. Controller 109 may comprise of one or more processors (processor 111) configured to access and process a set of instructions in a program code stored in programmable memory (memory 112). The one or more processors of controller 109 may run or execute one or more software programs or set of instructions that may be stored in memory 112 in order to perform the various functions of access device 101.

Access device 101 may further comprise user interface 110, which is configured to facilitate user interaction with access device 101 and access to a client device. User interface 110 may include any device or apparatus configured to allow the user to input or receive information to or from access device 101. For example, user interface 110 may include a numbered keypad, an alphanumeric keyboard, a visual display screen, a speaker, a microphone, an iris scanner, a fingerprint scanner, or visual recognition scanner.

Access device 101, controller 105, actuator 106, and sensor 107 are housed within access device housing 104. Access device housing 104 may be any type of housing and made of any type of material suitable to cover the internal components of access device 101 from the surrounding environment and elements. Typically, access device housing 104 will preserve user access to user interface 110, and therefore may not fully cover or encompass user interface 110.

Sensor 107 may be any sensor configured to sense, detect, perceive, or otherwise identify any specified stimulus from the surrounding environment in proximity to access device 101 and outside of access device housing 104, and respond to such stimulus by sending a signal to controller 105. In one embodiment, sensor 107 is a motion detector configured to detect motion of a user in proximity to access device 101 and outside of access device housing 104. In another embodiment, sensor 107 is a rain sensor configured to detect moisture in proximity to access device 101 and outside of access device housing 104.

Controller 105 may be configured to receive a signal from sensor 107 and initiate a response by signaling actuator 106 to actuate deployable cover 108. Controller 105 may comprise an internal timer and an access device interface 113 configured to communicate with controller 109. In one embodiment both controllers 105 and 109 may be combined to consist of a single controller, controller 109, to be configured and perform the same functions.

Deployable cover 108 may be any type of protective piece, cover, or element configured to partially or fully cover user interface 110 from the surrounding environment. Deployable cover 108 may be visually transparent, semi-transparent, or opaque in its appearance.

Figure 2:
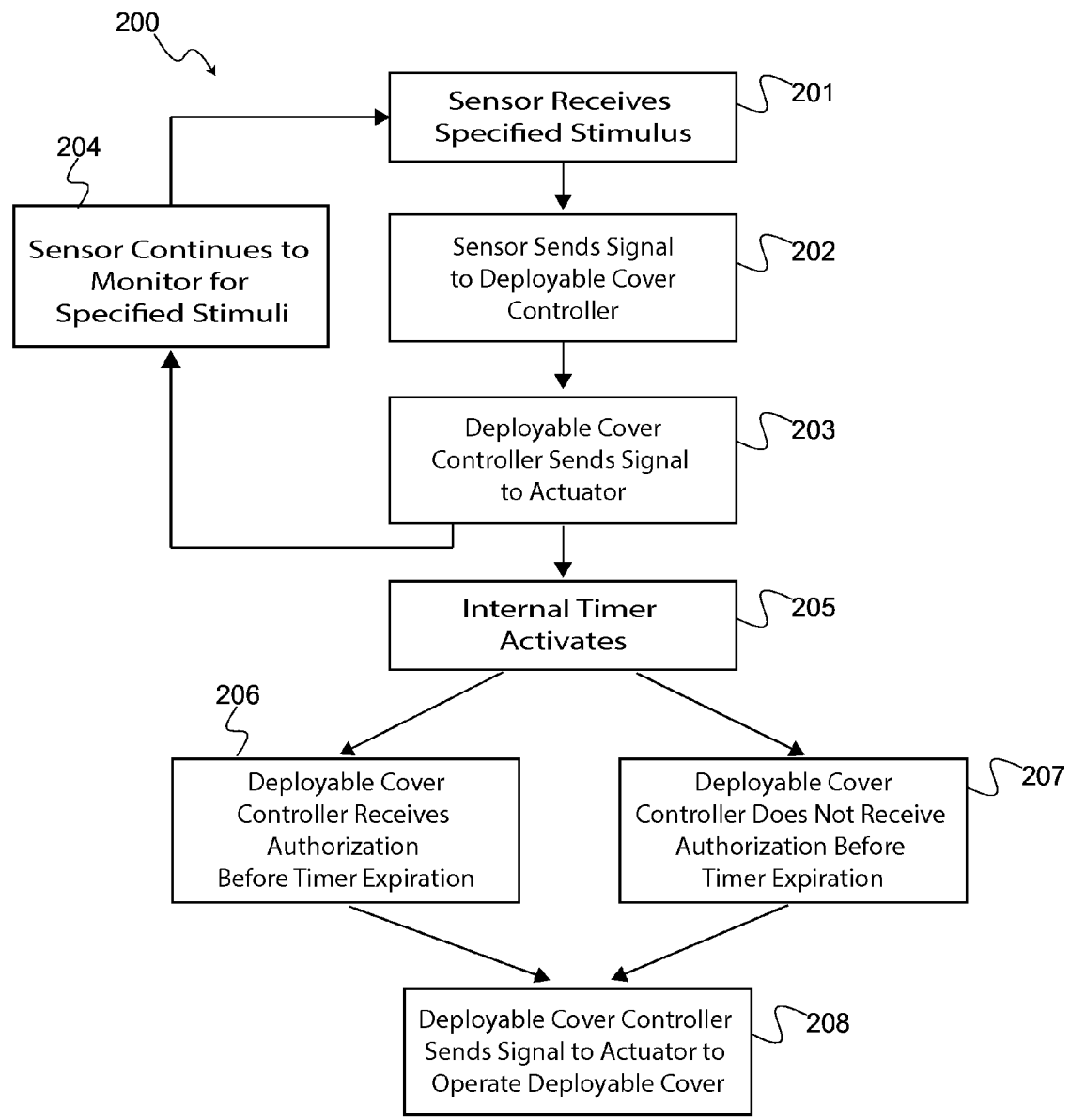
FIG. 2 is a flowchart depicting one method for operating a deployable cover for an access device in accordance with the present invention.

FIG. 2 is a flowchart depicting one method for operating a deployable cover for an access device in accordance with the present invention. More specifically, method 200 is illustrated as a series of steps among one embodiment of the present invention, which are shown in a particular sequence but may be practiced in any other conceivable sequence or interaction with the access device components without deviating from the scope of the present invention.

In Step 201, one or more sensors in communication with the deployable cover controller and configured to detect certain specified stimuli, receive such stimuli. In Step 202, one or more of the sensors may send a signal to the deployable cover controller that a stimulus has been received. In Step 203, the deployable cover controller may send a signal to the actuator to operate the deployable cover. In Step 204, the one or more sensors may continue to monitor for the specified external stimuli. In one embodiment, a loop is created between Step 201 and Step 204, wherein the one or more sensors continue to monitor for specified external stimuli and then receive such stimuli. In Step 205, an internal timer in communication with the actuator may activate upon operation of the deployable cover. In another embodiment, the internal timer may activate upon receiving the initial signal from the one or more sensors. In yet another embodiment, the internal timer may activate upon the controller sending a signal to the actuator to operate the deployable cover. The internal timer in Step 205 may be preset for any admin determined or manufacturer determined time limit. In Step 206, the deployable cover controller receives authorization from the access device controller before the internal timer has expired and, in one embodiment, may move forward with the process of actuating the deployable cover without adhering to the time limit. In Step 207, the deployable cover controller does not receive authorization from the access device controller before the internal timer has expired and, in one embodiment, may defer the process of actuating the deployable cover until the time limit has lapsed. In Step 208, the deployable cover controller may signal the actuator to operate deployable cover.

Figure 3A:
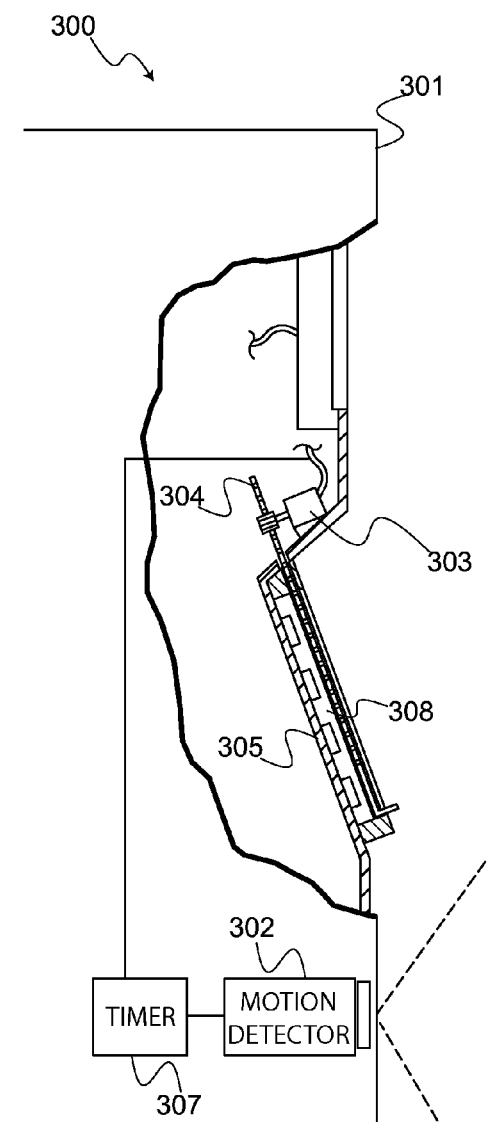
FIG. 3(a) is a cross-sectional side view of one embodiment of the present invention.

FIG. 3(a) depicts a cross-sectional side view of one embodiment of the present invention. More specifically FIG. 3(a) depicts access device 300 wherein the sensor is a motion sensor (motion detector 302), deployable cover 304 actuates at an angle with respect to the x-axis, the x-axis being parallel to the base of access device 300, and is in the closed position.

Figure 3B:
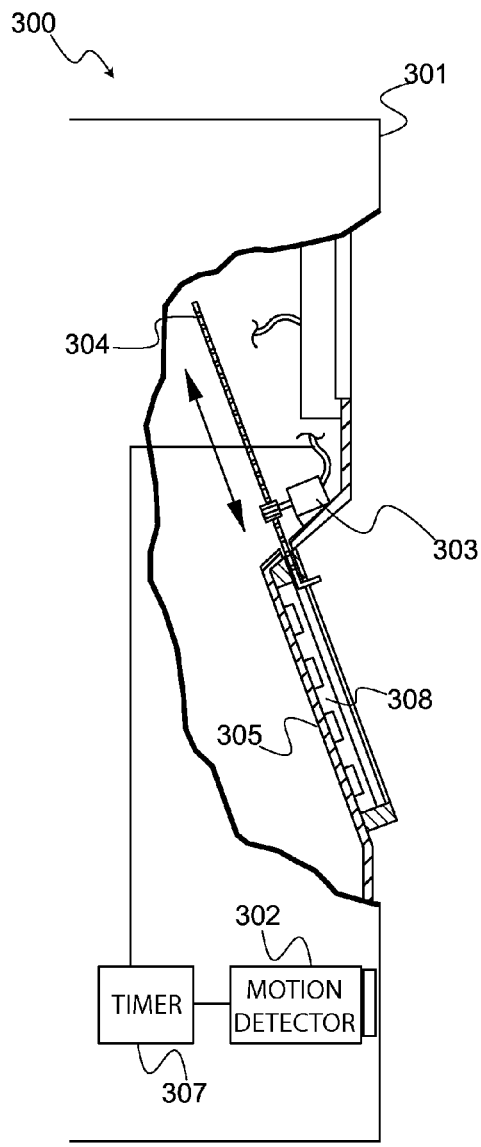
FIG. 3(b) is a cross-sectional side view of another embodiment of the present invention.

Access device housing 301 may provide a partially encompassing outer cover for the internal components. In one embodiment the one or more sensors could be configured to detect motion as depicted in motion detector 302. Likewise, internal timer 307 may be in communication with motion detector 302 and actuator 303. In one embodiment, when a signal from the controller is sent to actuator 303 the actuator will operate deployable cover 304 and reveal, to the user, user interface 305. User interface 305 may be attached or integrated with access housing 301. Furthermore, actuator 303 may be configured to be mounted internal to and connected to access device housing 301 as is depicted in FIGS. 3(a) and 3(b) in order to protect it from the elements. Alternatively, actuator 303 may be mounted external to access device housing 301 in order to facilitate easier repairs and maintenance.

When deployable cover 304 is opened to reveal user interface 305, it may be retracted into an empty compartment within access device housing 301. When the deployable cover 304 is closed over the user interface 305, there may be a cavity 308 present between them. This cavity could exist for the purpose of ensuring that foreign matter, which may be trapped on the surface of user interface 305, does not hinder or obstruct the actuation of deployable cover 304. Another purpose of having cavity 308 could be to facilitate looser manufacturing tolerances in order to keep production costs of access device 300 to a minimum.

FIG. 3(b) is an additional cross-sectional side view of the same embodiment of the present invention as FIG. 3(a). In this view, deployable cover 304 is depicted in the open position thus revealing user interface 305 and internal cavity 308 which exists between user interface 305 and deployable cover 304 while in the closed position.

In one embodiment, either the access device housing 301 or the deployable cover 304 may incorporate a strip, band, or other material used to create a seal in order to further help prevent unwanted substances from interacting with the user interface 305 while not in use. Whenever the deployable cover 304 is retracted, the repeatable seal is broken until the deployable cover 304 is once again actuated to cover the user interface 305.

Figure 4:
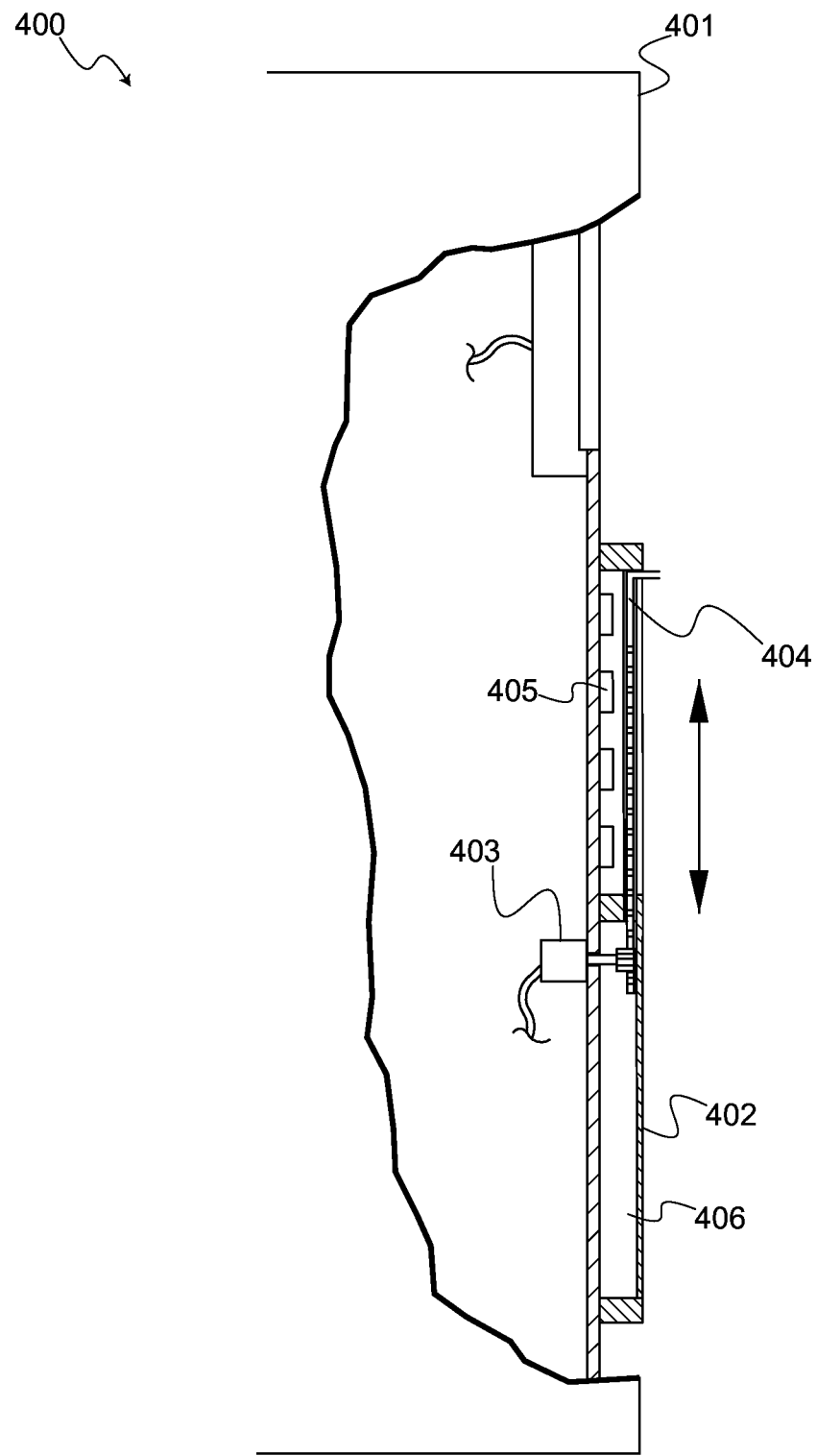
FIG. 4 is a cross-sectional side view of another embodiment of the present invention.

FIG. 4 is a cross-sectional side view of one embodiment of the present invention, wherein the deployable cover 404 articulates movement perpendicular to the x-axis, the x-axis being the base of access device 400.

Access device housing 401 may provide a partially encompassing outer cover for the internal components. In one embodiment, deployable cover housing 402 could be configured to be mounted external to access device housing 401 as is depicted in FIG. 4. When actuator 403 receives the signal from the controller to operate deployable cover 404, deployable cover 404 may retract within deployable cover housing 402. Deployable cover cavity 406, present in the closed position and between user interface 405 and deployable cover 404, may become open to the environment and the user upon actuation of deployable cover 404. Deployable cover cavity 406 may become filled by deployable cover 404 when it is in the opened position and has been retracted within deployable cover housing 402. The deployable cover cavity 406 may be situated above or below the user interface 405.

In one embodiment, either the deployable cover housing 402 or the deployable cover 404 may incorporate a strip, band, or other material used to create a seal in order to further help prevent unwanted substances from interacting with the user interface 405 while not in use. Whenever the deployable cover 404 is retracted, the repeatable seal is broken until the deployable cover 404 is once again actuated to cover the user interface 405.

In another embodiment, either the access device housing 401 or the deployable cover 404 may incorporate the strip, band, or other material used to create a seal in order to help prevent the same occurrences from happening.

Furthermore, in the exemplary embodiment shown, access device housing 401 does not house sensors. Instead, a simple timer or controller 410, including a timing device may be implemented so that housing 401 can automatically close cover 404 whenever the device is not in use. In such exemplary embodiment, a user may simply walk up to device 400 and manually open cover 404—in the present example, by pulling down on a lip of cover 404. At this point, controller 410 may be configured to detect that actuator 403 has been back driven, or that cover 404 has been opened, and start counting a predetermined or programmable period of time. After the predetermined time has lapsed, controller 410 may send a signal to actuator 403 in order to automatically close cover 404. In exemplary embodiments, manual operation of cover 404 is possible in both directions so that an individual may manually open or manually close cover 404.

FIG. 5(a)-5(d) depict several diagrams of different configurations of a housing with a protective cover, illustrating various possible exemplary embodiments of the present invention.

Figure 5A:
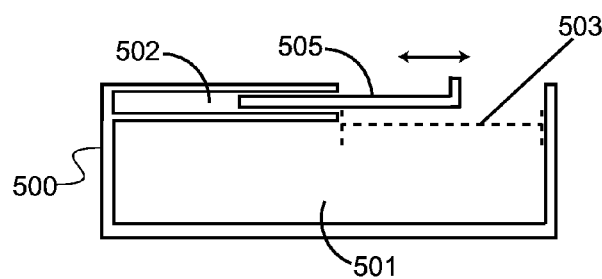
FIG. 5(a)-5(d) depict several diagrams of different configurations of a housing with a protective cover, illustrating various possible exemplary embodiments of the present invention.
Figure 5B:
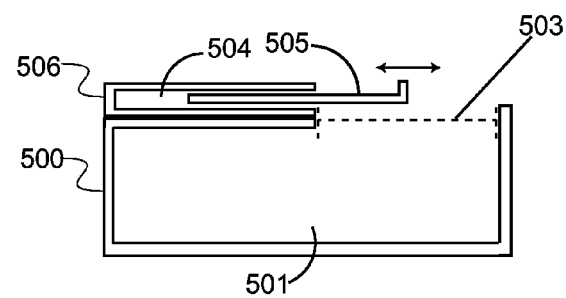

FIG. 5(a) shows a top plan view of housing 500, which includes a deployable cover 505 that is configured to slide sideways between an opened and closed position. Furthermore, housing 500 typically includes a first containment cavity (cavity 501) for containing the components of an access device, such as a power supply, controller, and user interface, as well as a second containment cavity (cavity 502), which may be a deployable cover cavity or cavity for receiving the housing's deployable cover 505 whenever cover 505 is retracted to open or reveal opening 503. Opening 503 may be any opening or access means that exposes a user interface or user interface component contained within housing 500, such as a display or a keyboard of the access device. FIG. 5(b) shows another embodiment of housing 500, which includes an external housing 506 with a cavity 504, situated external to housing 500. As with the embodiment shown in FIG. 5(a), the embedment of FIG. 5(b) comprises a cover that moves sideways between opened and closed positions—the only difference being a structural one, whereby external housing 506 provides cavity 504 to receive deployable cover 505.

Figure 5C:
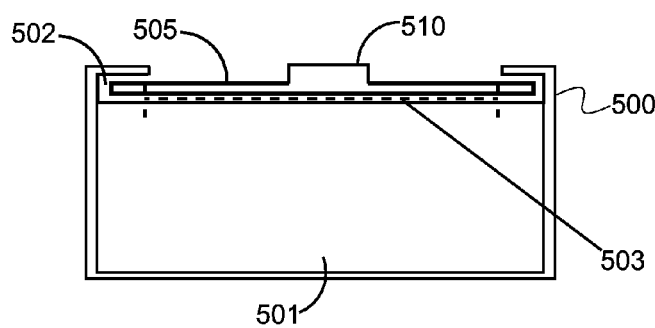
Figure 5D:
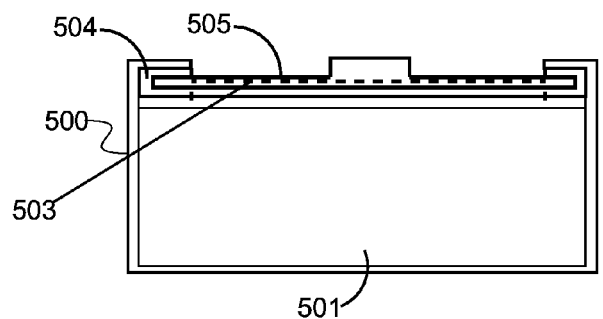

FIG. 5(c) shows a top plan view of yet another embodiment of housing 500, which includes a deployable cover configured to slide up and down between an opened and closed position. In this embodiment, note cover 505 may include cover lip 510, which may aid a user to manually operate cover 505. Finally, FIG. 5(d) shows yet another embodiment of housing 500, which includes an external cavity similar to the external cavity 504 of the embodiment shown in FIG. 5(b), whereby it is situated external to housing 500 and configured so that cover 505 moves up and down between opened and closed positions. As is illustrated by these several examples, numerous configurations are possible without deviating from the scope of the present invention.

Figure 6A:
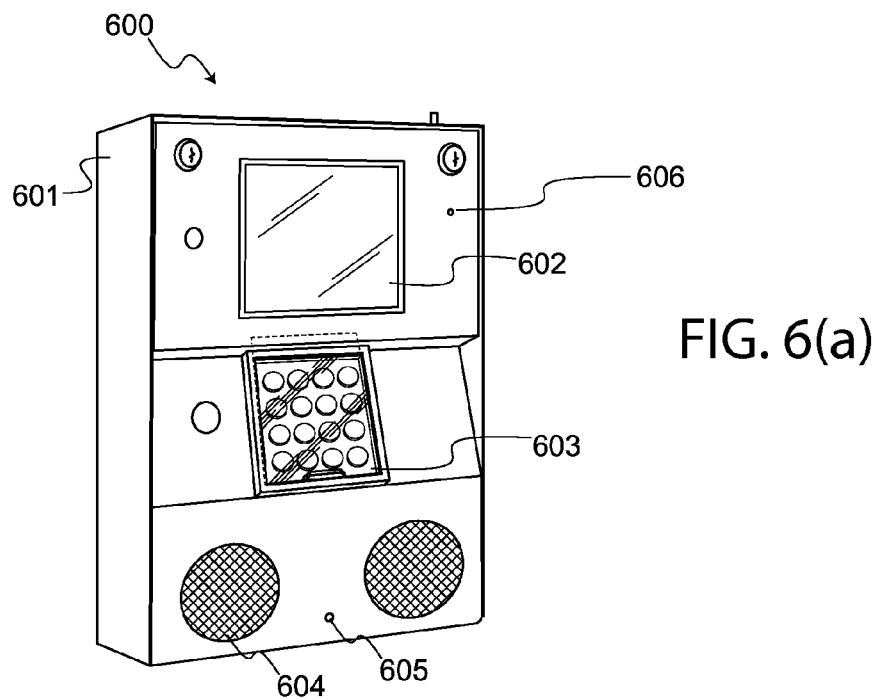
FIG. 6(a) illustrates a representational view of one embodiment of the present invention, wherein the deployable cover is in the closed position and actuates at a slight angle with respect to the x-axis, the x-axis being parallel to the base of the access device.
Figure 6B:
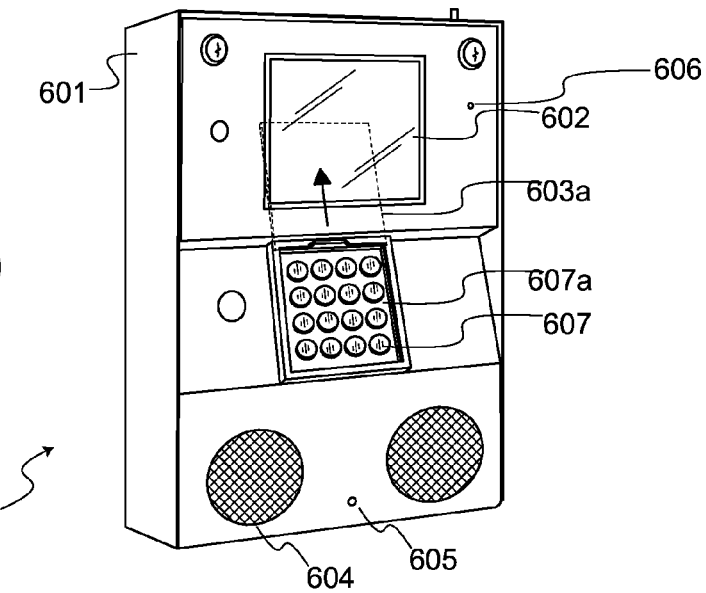
FIG. 6(b) illustrates an additional representational view of the embodiment of the present invention shown in FIG. 6(a) in the opened position.

FIG. 6(a) illustrates a representational view of one embodiment of the present invention, wherein the numerical keypad or alphanumeric keyboard is covered by deployable cover 603 that articulates movement at a slight angle with respect to the x-axis, the x-axis being parallel to the base of access device 600, and is in the closed position. In the present embodiment, access device 600 comprises: a user interface configured to facilitate a communication with a client device and authorize access via a movable barrier such as barrier 103; and a housing 601 containing the user interface, including: an opening 607a for exposing a keypad 607 of the user interface; a cover 603 for covering the keypad; and a cover cavity 603a adjacent to the opening, for slidably receiving the cover whenever the cover is opened to reveal the keypad, wherein: the cover cavity is above of the opening; and the cover is configured to slide upwards and downwards between opened and closed positions. As such, access device housing 601 may include display 602, speaker 604, microphone 605, and sensors 606. Furthermore, in the present embodiment, user interface comprises of display 602 and numerical keypad 607 as separate components whereby only the keypad is covered, but in other embodiments, the user interface may be a single component—such as a touch screen. FIG. 6(b) illustrates an additional representational view of the embodiment shown in FIG. 6(a), wherein the numerical keypad or alphanumeric keyboard is covered by deployable cover 603 is in the opened position.

Additionally, in one embodiment, whenever the deployable cover 603 is retracted to the open position to reveal the numerical keypad 607, the deployable cover may retract into a cavity present behind the display 602. In another embodiment, the deployable cover 603 may retract into a cavity below the numerical keypad 607 and behind the speaker 604 and microphone 605.

Figure 7A:
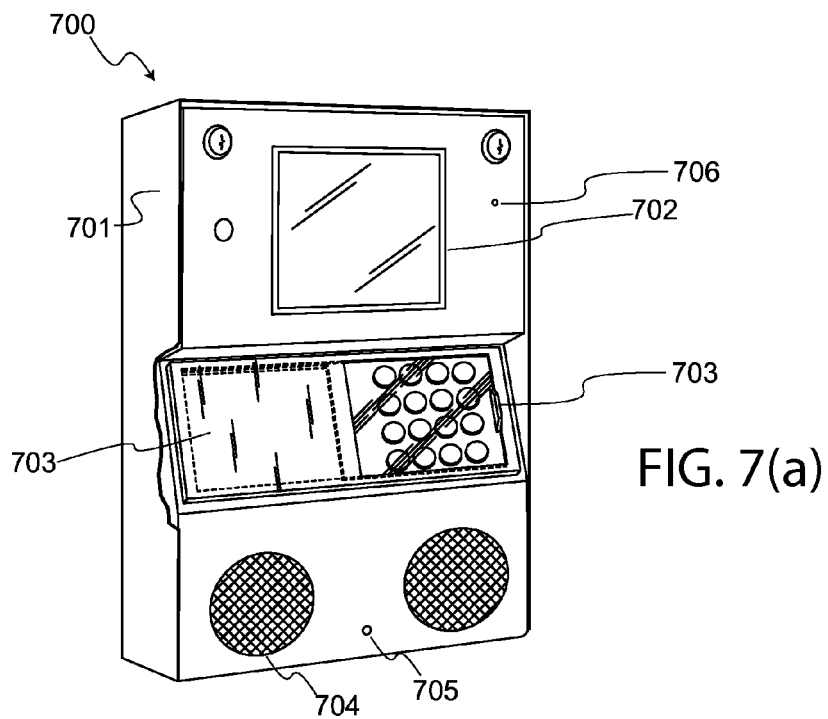
FIG. 7(a) illustrates a representational view of one embodiment of the present invention, wherein the deployable cover is in the closed position and articulates movement parallel to the x-axis, the x-axis being parallel to the base of access device.

FIG. 7(a) illustrates a representational view of one embodiment of the present invention, wherein the numerical keypad or alphanumeric keyboard is covered by deployable cover 703 that articulates movement parallel to the x-axis, the x-axis being parallel to the base of access device 700, and is in the closed position. In the present embodiment, access device 700 comprises: a user interface configured to facilitate a communication with a client device and authorize access via a movable barrier such as barrier 103; and a housing 701 containing the user interface, including: an opening 707a for exposing a keypad 707 of the user interface; a cover 703 for covering the keypad; and a cover cavity 703a adjacent to the opening, for slidably receiving the cover whenever the cover is opened to reveal the keypad, wherein: the cover cavity is situated to the side of the opening; and the cover is configured to slide sideways between opened and closed positions. In the present embodiment, access device 700 comprises access device housing 701, display 702, speaker 704, microphone 705, and sensors 706. Furthermore, in the present embodiment, user interface comprises of display 702 and numerical keypad 707. Additionally, speaker 704 and microphone 705 are integrated with access device housing 701.

Figure 7B:
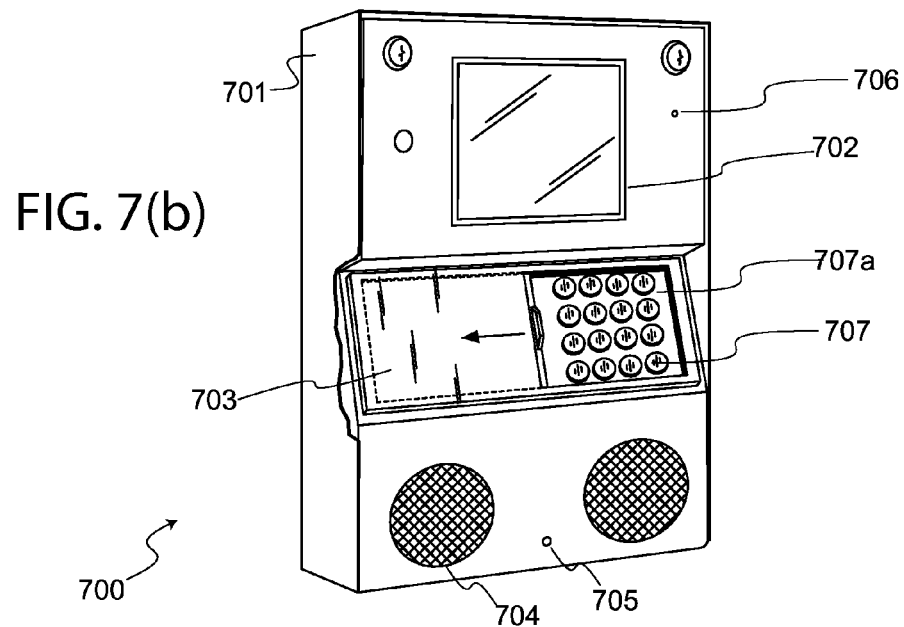
FIG. 7(b) illustrates an additional representational view of the embodiment of the present invention shown in FIG. 7(a) in the opened position.

FIG. 7(b) illustrates an additional representational view of the embodiment shown in FIG. 7(a), wherein the deployable cover 703 is in the opened position. In exemplary embodiments, when deployable cover 703, in the present embodiment, covers the numerical keypad 707, there may be a cavity that exists between deployable cover 703 and numerical keypad 707. In one embodiment, either the access device housing 701 or the deployable cover 703 may incorporate a strip, band, or other material used to create a seal in order to further help prevent unwanted substances from interacting with the numerical keypad 703 while not in use. Whenever the deployable cover 703 is retracted, the repeatable seal is broken until the deployable cover 703 is once again actuated to cover the numerical keypad 707.

Additionally, in one embodiment, whenever the deployable cover 703 is retracted to the open position to reveal the numerical keypad 707, the deployable cover may retract into a cavity present behind the access device housing 701. In another embodiment, the deployable cover 703 may retract onto the surface of access device housing 701. In yet another embodiment, the deployable cover may be retracted into a deployable cover housing outside of and adjacent to the access device housing 701.

Figure 8A:
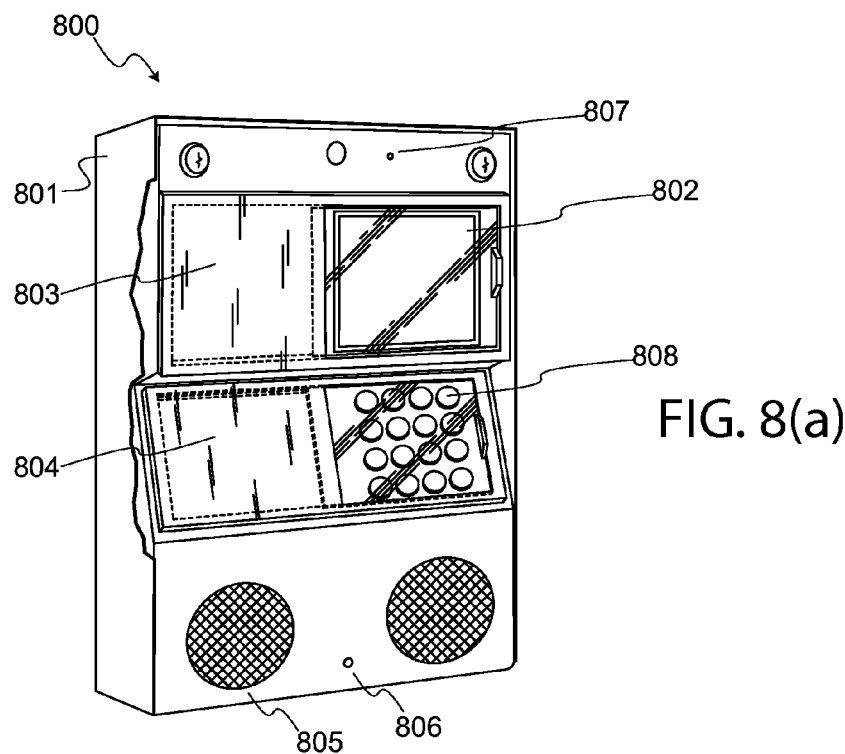
FIG. 8(a) illustrates a representational view of one embodiment of the present invention, wherein the deployable covers are in the closed positions and actuate parallel to the x-axis, the x-axis being parallel to the base of the access device.

FIG. 8(a) illustrates a representational view of one embodiment of the present invention, wherein both the display and the numerical keypad or alphanumeric keyboard are covered by separate deployable covers 803 and 804 respectively that articulate movement parallel to the x-axis, the x-axis being parallel to the base of access device 800 and are in the closed position. In the present embodiment, access device 800 further comprises of: access device housing 801, display 802, speaker 805, microphone 806, and sensors 807. Furthermore, in the present embodiment, user interface is depicted as display 802 and numerical keypad 808. Additionally, speaker 805 and microphone 806 are integrated with access device housing 801. The separate deployable covers are advantageous in that they protect both the display and numerical keypad or alphanumeric keyboard components of the user interface.

Figure 8B:
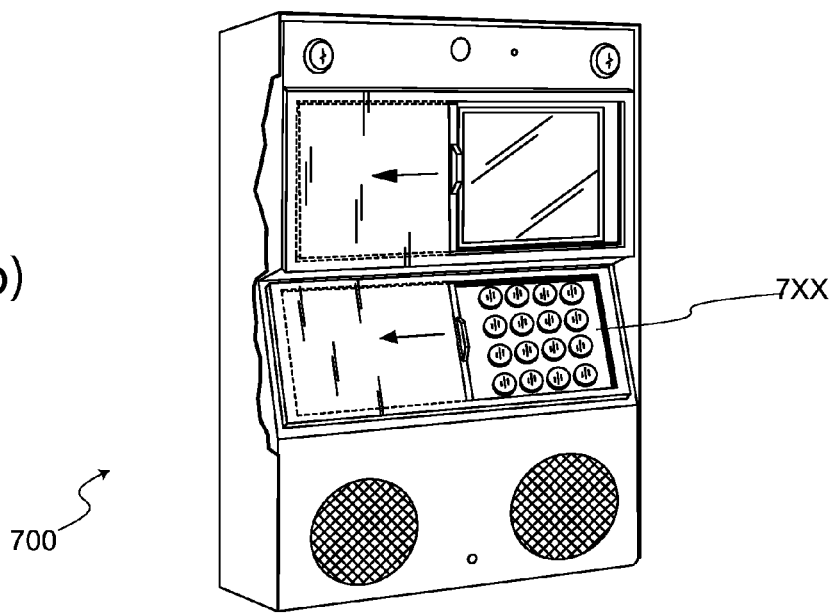
FIG. 8(b) illustrates a representational view of one embodiment of the present invention, wherein the deployable covers are in the opened positions and actuate parallel to the x-axis, the x-axis being parallel to the base of the access device.

FIG. 8(b) illustrates an additional representational view of one embodiment of the present invention as FIG. 8(a), wherein both the display and numerical keypad or alphanumeric keyboard are covered by separate deployable covers 803 and 804 respectively that articulate movement parallel to the x-axis, the x-axis being parallel to the base of access device 800 and is in the opened position. In the present embodiment, access device 800 further comprises of: access device housing 801, display 802, speaker 805, microphone 806, and sensors 807. Furthermore, in the present embodiment user interface comprises of display 802 and numerical keypad 808. Additionally, speaker 805 and microphone 806 are integrated with access device housing 801.

When deployable covers 803 and 804, in the present embodiment, cover the display 802 and numerical keypad 808, there may be one or two cavities that exist between the display 803, numerical keypad 808, and their associated deployable covers 803 and 804. In one embodiment, either the access device housing 801 or one or both of the deployable cover 803 and 804 may incorporate a strip, band, or other material used to create a seal in order to further help prevent unwanted substances from interacting with the display 802 and numerical keypad 808 while not in use. Whenever one or both of the deployable covers 802 and 803 are retracted, the repeatable seal is broken until the deployable covers 802 and 803 are once again actuated to the closed position.

Additionally, in one embodiment, whenever one or both of the deployable covers 802 and 803 are retracted to the open position, the covers may retract into cavities present behind the access device housing 801. In another embodiment, the deployable covers may retract onto the surface of access device housing 801. In yet another embodiment, the deployable covers may be retracted into deployable cover housings outside of and adjacent to the access device housing 801.

Figure 9A:
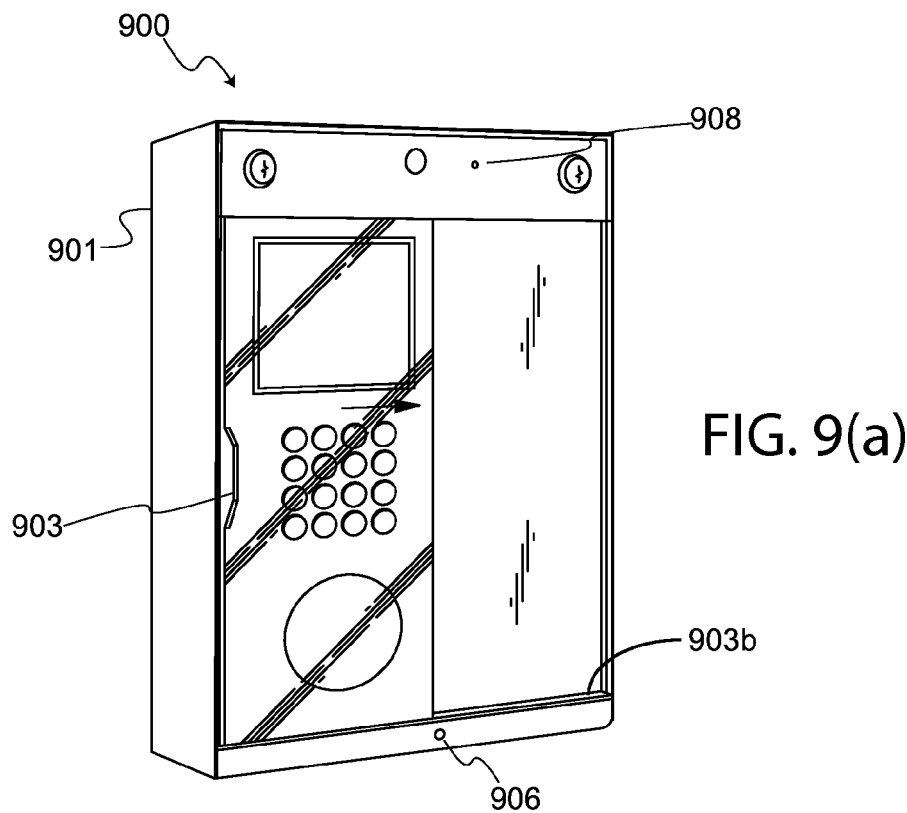
FIG. 9(a) illustrates a representational view of one embodiment of the present invention, wherein the deployable cover is in the closed position and actuates parallel to the x-axis, the x-axis being parallel to the base of the access device.
Figure 9B:
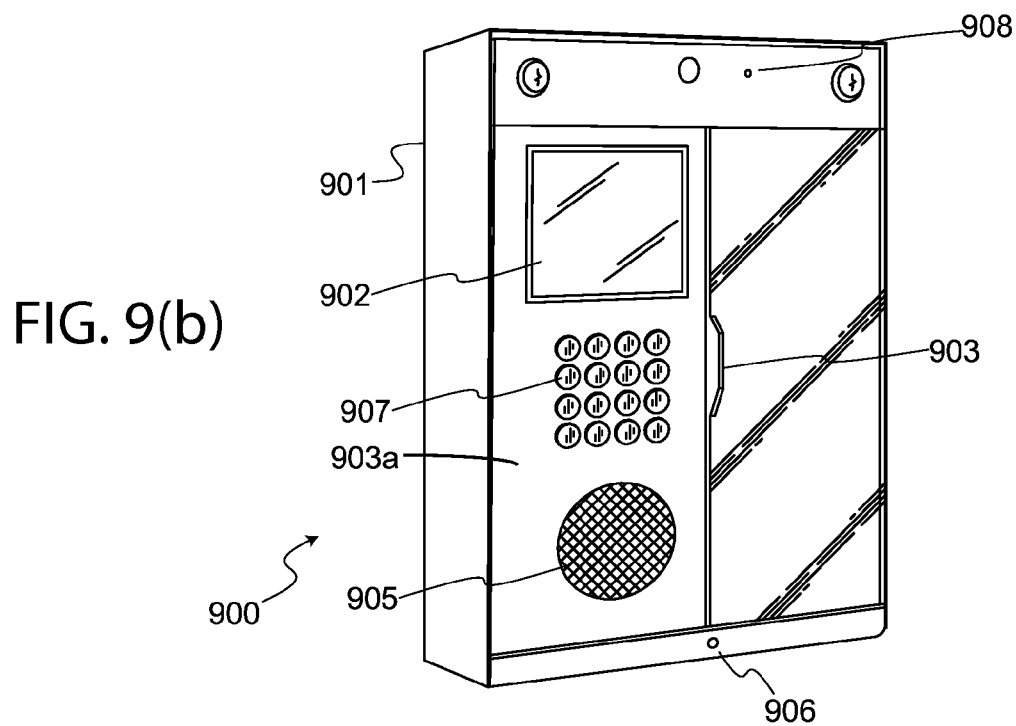
FIG. 9(b) illustrates a representational view of one embodiment of the present invention, wherein the deployable cover is in the opened position and actuates parallel to the x-axis, the x-axis being parallel to the base of the access device.

FIG. 9(*a*) illustrates a representational view of one embodiment of the present invention, wherein both the display 902 and the numerical keypad 907 are covered by deployable cover 903 that articulates movement parallel to the x-axis, the x-axis being parallel to the base of access device 900 and is in the closed position. Access device 900 may comprise of access device housing 901, display 902, speaker 905, microphone 906, numerical keypad 907, and sensors 908. In the present embodiment, access device 900 comprises: a user interface configured to facilitate a communication with a client device and authorize access via a movable barrier such as barrier 103; and a housing 901 containing the user interface (902, 907), including: an opening 903*a* for exposing a keypad 907 of the user interface; a cover 903 for covering the keypad; and a cover cavity 903*b* adjacent to the opening, for slidably receiving the cover whenever the cover is opened to reveal the keypad, wherein: the cover cavity 903*b* is situated to the side of the opening 903*a*; and the cover 903 is configured to slide sideways between opened and closed positions. In the present embodiment user interface comprises of depicted as display 902 and numerical keypad 907. Additionally, speaker 905 and microphone 906 are integrated with access device housing 901. The single deployable cover that covers both display 902 and numerical keypad 907 is advantageous in that it protects both components of the user interface.

FIG. 9(*b*) illustrates an additional representational view of one embodiment of the present invention as FIG. 9(*a*), wherein both the display and numerical keypad or are covered by deployable cover 903 that articulates movement parallel to the x-axis, the x-axis being parallel to the base of access device 900 and is in the opened position.

When deployable cover 903, in the present embodiment, covers the display 902 and numerical keypad 907, there may be a cavity that exists between deployable cover 903 and the user interface: display 902 and numerical keypad 907. In one embodiment, either the access device housing 901 or the deployable cover 903 may incorporate a strip, band, or other material used to create a seal in order to further help prevent unwanted substances from interacting with display 902 and numerical keypad 907 while not in use. Whenever the deployable cover 903 is retracted, the repeatable seal is broken until the deployable cover 903 is once again actuated to cover the display 902 and numerical keypad 907.

Figure 10A:
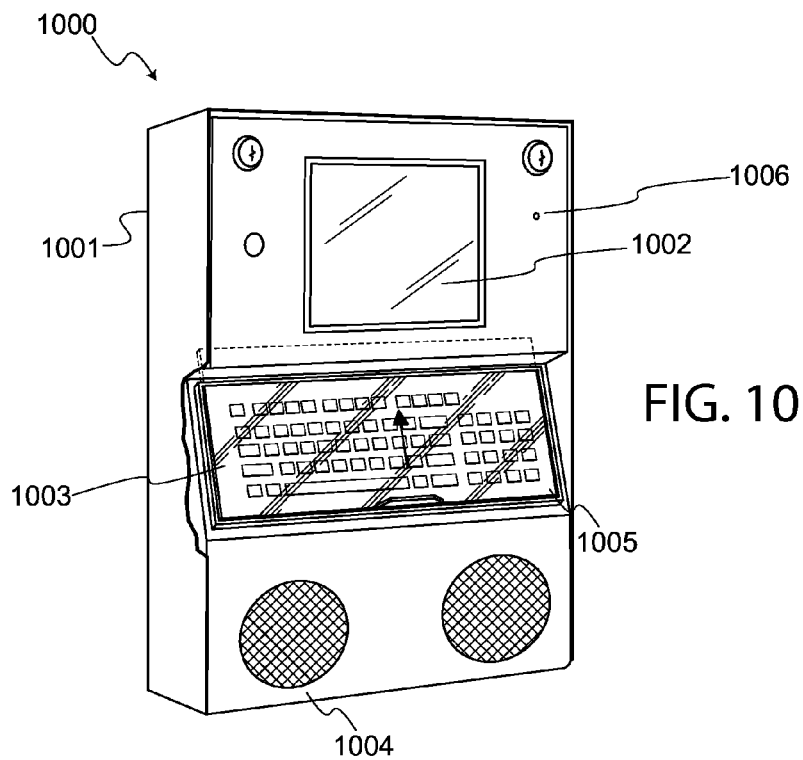
FIG. 10(a) illustrates a representational view of one embodiment of the present invention, wherein the deployable cover actuates mostly perpendicular to the x-axis, the x-axis being parallel to the base of the access device.
Figure 10B:
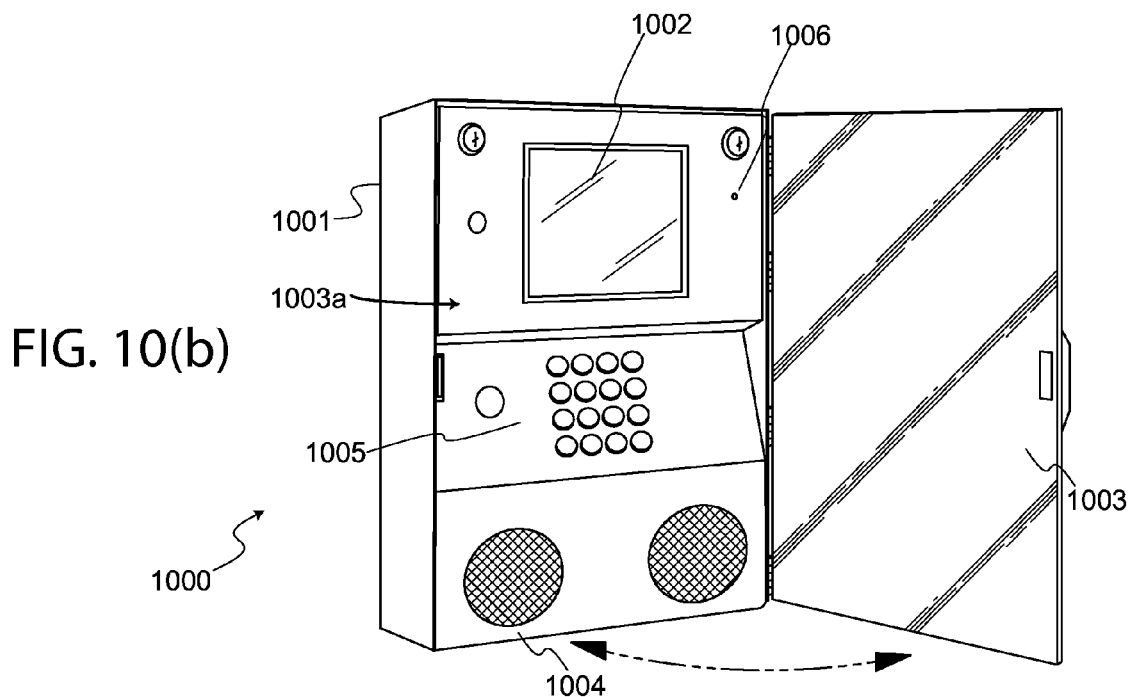
FIG. 10(b) illustrates a representational view of one embodiment of the present invention, wherein the deployable cover opens outward and closes inward with respect to the user interface of the access device.

FIG. 10(*a*) illustrates a representational view of one embodiment of the present invention, wherein the alphanumeric keyboard component of the user interface is covered by deployable cover 1003 that articulates movement mostly perpendicular to the x-axis, the x-axis being parallel to the base of access device 1000 and is in the closed position. More specifically, access device 1000 comprises of access device housing 1001, display 1002, speaker 1004, alphanumeric keyboard 1005, and sensors 1006. In the present embodiment user interface comprises of display 1002 and alphanumeric keyboard 1005. Additionally, speaker 1004 is depicted as being integrated with access device housing 1001.

When deployable cover 1003, in the present embodiment, covers the alphanumeric keyboard 1005, there may be a cavity that exists between deployable cover 1003 and alphanumeric keyboard 1005. In one embodiment, either the access device housing 1001 or the deployable cover 1003 may incorporate a strip, band, or other material used to create a seal in order to further help prevent unwanted substances from interacting with the alphanumeric keyboard 1005 while not in use. Whenever the deployable cover 1003 is retracted, the repeatable seal is broken until the deployable cover 1003 is once again actuated to cover the alphanumeric keyboard 1005.

Additionally, in one embodiment, whenever the deployable cover 1003 is retracted to the open position to reveal the alphanumeric keyboard 1005, the deployable cover may retract into a cavity present behind the display 1002. In another embodiment, the deployable cover 1003 may retract into a cavity below the numerical keypad 1005 and behind the speaker 1004.

FIG. 10(*b*) illustrates a representational view of one embodiment of the present invention, wherein both the display and numerical keypad are covered by deployable cover 1003 that articulates movement by opening outward and closing inward with respect to the user interface of the access device 1000 and is in the opened position, thus revealing both display 1002 and numerical keypad 1005 to a user. More specifically, access device 1000 comprises of: housing 1001, display 1002, speaker 1004, numerical keypad 1005, and sensors 1006. In the present embodiment the user interface comprises of display 1002 and numerical keypad 1005. Additionally, speaker 1005 is depicted as being integrated with access device housing 1001. In exemplary embodiments, access device 1001 may comprise a user interface (for example, display 1002, speaker 1004, numerical keypad 1005) configured to facilitate a communication with a client device and authorize access via a movable barrier; and a housing 1001 containing the user interface, including: an opening 1003*a* for exposing a keypad of the user interface; and a hinged cover 1003 for covering the opening and configured to swing between an opened and closed position.

A deployable cover for an access device has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. An access device for a movable barrier system, comprising:
    a user interface configured to facilitate a communication with a client device and authorize access via a movable barrier;
    a housing containing the user interface, including:
        an opening for exposing a keypad of the user interface;
        a cover for covering the keypad; and
        a cover cavity adjacent to the opening, for slidably receiving the cover whenever the cover is opened to reveal the keypad, wherein:
            the cover cavity is situated to a side of the opening; and
            the cover is configured to slide sideways between opened and closed positions;
    an actuator contained within the housing and mechanically coupled to the cover; and
    a controller in communication with the actuator situated within the housing and configured to automatically actuate the cover in response to a predetermined event.

2. The access device of claim 1, wherein the cover is positioned along the cover cavity so that a face of the cover slides sideways between opened and closed positions perpendicular to a base of the housing.

3. The access device of claim 1, further comprising:
    one or more sensors housed within the housing and in communication with the controller, the one or more sensors configured to send a signal to the controller concerning the predetermined event.

4. The access device of claim 1, wherein the controller is further configured to:
    detect a manual opening of the cover; and
    execute a timer in response to detecting that the cover is opened, in order to automatically actuate the cover to the closed position.

5. The access device of claim 1, wherein the controller is further configured to:
    detect a presence of rain via one or more rain sensors in communication with the controller; and
    generate a signal to automatically close the cover in response to detecting rain.

6. The access device of claim 1, wherein the controller is further configured to:
    detect a motion of a user of the device via one or more motion sensors in communication with the controller; and
    generate a signal to automatically open the cover in response to detecting motion.

7. The access device of claim 1, wherein the user interface comprises a touch-screen display, and the keypad is a virtual keypad.

8. The access device of claim 1, wherein the user interface comprises a display and the keypad, and the keypad is a physical QWERTY keyboard.

9. An access device for a movable barrier system, comprising:
    a user interface configured to facilitate a communication with a client device and authorize access via a movable barrier;
    a housing containing the user interface, including:
        an opening for exposing a keypad of the user interface;
        a cover for covering the keypad; and
        a cover cavity adjacent to the opening, for receiving the cover whenever the cover is opened to reveal the keypad, wherein:
            the cover cavity is situated above or below the opening; and
            the cover is configured to slide up and down between opened and closed positions respectively;
    an actuator contained within the housing and mechanically coupled to the cover; and
    a controller in communication with the actuator situated within the housing and configured to automatically actuate the cover in response to a predetermined event.

10. The access device of claim 9, wherein the cover is positioned along the cover cavity so that a face of the cover slides up and down between opened and closed positions perpendicular to a base of the housing.

11. The access device of claim 9, wherein the cover is positioned along the cover cavity so that a face of the cover slides up and down between opened and closed positions at an angle with respect to a base of the housing.

12. The access device of claim 9, wherein the controller is further configured to:
    detect a manual opening of the cover; and
    execute a timer in response to detecting that the cover is opened, in order to automatically actuate the cover to the closed position.

13. The access device of claim 9, wherein the controller is further configured to:
    detect a presence of rain via one or more rain sensors in communication with the controller; and
    generate a signal to automatically close the cover in response to detecting rain.

14. The access device of claim 9, wherein the controller is further configured to:
    detect a motion of a user of the device via one or more motion sensors in communication with the controller; and
    generate a signal to automatically open the cover in response to detecting motion.

15. The access device of claim 9, wherein the user interface comprises a display and the keypad, and the keypad is a physical QWERTY keyboard.

16. An access device for a movable barrier system, comprising:
    a user interface configured to facilitate a communication with a client device and authorize access via a movable barrier;
    a housing containing the user interface, including:
        an opening for exposing a keypad of the user interface; and
        a hinged cover for covering the opening and configured to swing between an opened and closed position; and
    an actuator contained within the housing and mechanically coupled to the hinged cover; and
    a controller in communication with the actuator situated within the housing and configured to automatically actuate the hinged cover in response to a predetermined event.

17. The access device of claim 16, wherein the controller is further configured to: detect a manual opening of the hinged cover; and execute a timer in response to detecting that the cover is opened, in order to automatically actuate the hinged cover to the closed position.

* * * * *